United States Patent [19]

Paradise

[11] Patent Number: 5,184,135
[45] Date of Patent: Feb. 2, 1993

[54] PHASE MEASUREMENT OF RECEIVED PSEUDONOISE SEQUENCE USING DIGITAL CORRELATION

[75] Inventor: Ronald Y. Paradise, Hillsdale, N.J.

[73] Assignee: GEC-Marconi Electronic Systems Corp., Wayne, N.J.

[21] Appl. No.: 856,549

[22] Filed: Mar. 23, 1992

[51] Int. Cl.[5] .................... G01S 13/44; G01S 7/295
[52] U.S. Cl. ..................................... 342/149; 375/1; 342/189
[58] Field of Search ................ 342/149, 152, 34, 386, 342/417, 442, 189, 194; 375/1; 307/514, 516; 328/109

[56] References Cited

U.S. PATENT DOCUMENTS

| | | | |
|---|---|---|---|
| 3,956,749 | 5/1976 | Magorian | 342/189 X |
| 4,346,382 | 8/1982 | Bosc et al. | 342/149 X |
| 4,564,841 | 1/1986 | Neidell | 342/386 |
| 4,608,566 | 8/1986 | Ennis et al. | 342/28 |
| 4,679,207 | 7/1987 | Tsuda | 375/1 |
| 4,706,093 | 11/1987 | Groth, Jr. | 342/427 |
| 4,924,188 | 5/1990 | Akazawa et al. | 375/1 X |
| 4,933,952 | 6/1990 | Albrieux et al. | 375/1 |

*Primary Examiner*—Gilberto Barron, Jr.
*Attorney, Agent, or Firm*—David L. Davis

[57] ABSTRACT

A system which receives a pseudonoise sequence signal quantizes the phase of the received signal in digital form as in-phase and quadrature digital signals. A digital correlator correlates the digital signals against the stored pseudonoise code sequence and separately accumulates the results. The accumulated results are vector added and a peak detector is utilized to determine the time of arrival of the signal. At the same time, the accumulated results are used by an arctangent calculator to derive a phase signal, which is gated as an output when the time of arrival is determined. An embodiment in a phase monopulse radar system collects the signals from four antennas spaced as pairs in both azimuth and elevation to determine the azimuth and elevation phase differences of the received signal. In this embodiment, a single digital correlator is utilized, the inputs to which are time multiplexed.

7 Claims, 3 Drawing Sheets

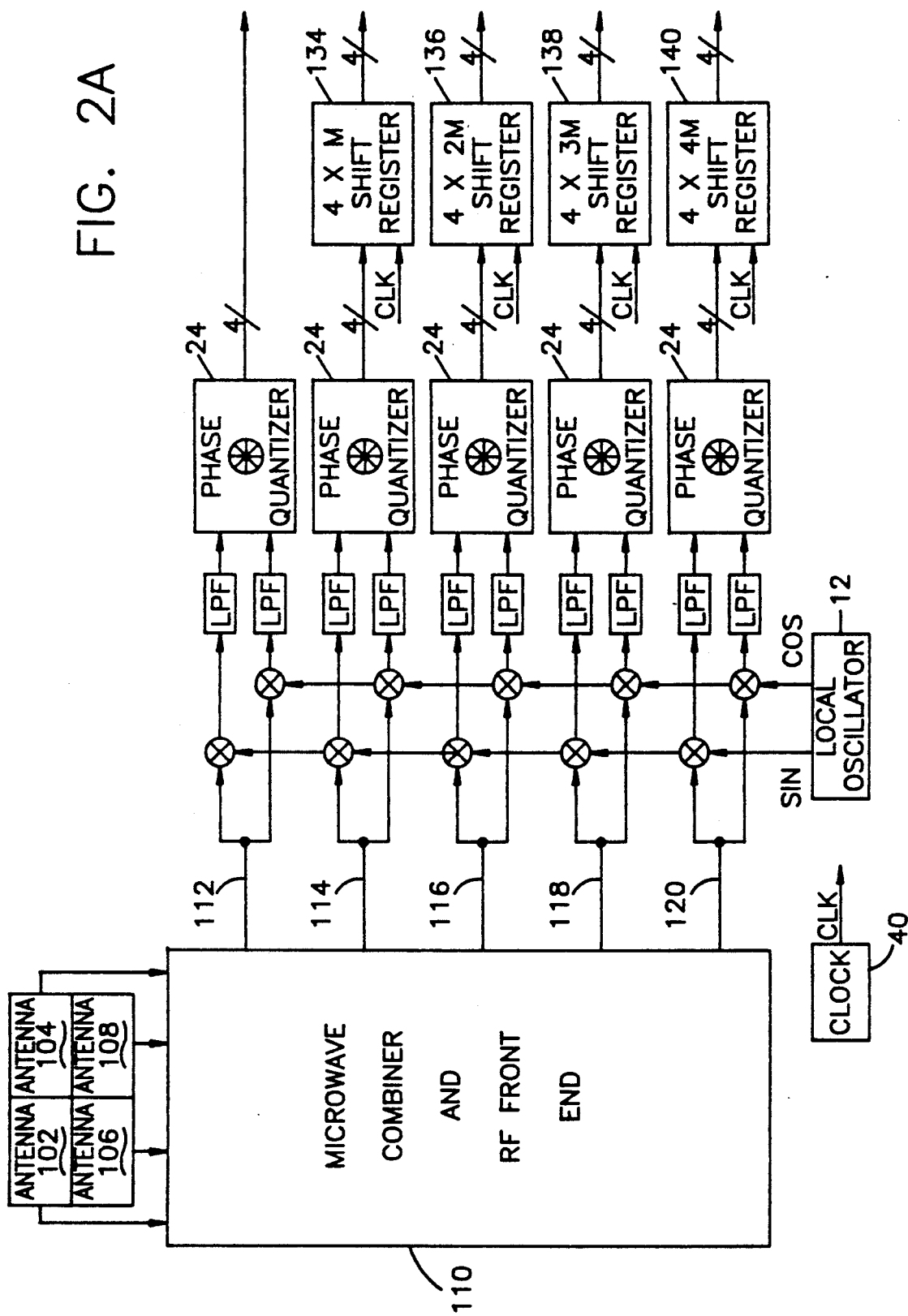

PHASE MEASUREMENT OF RECEIVED PSEUDONOISE SEQUENCE USING DIGITAL CORRELATION

BACKGROUND OF THE INVENTION

This invention relates to a radio frequency transmission and receiving system and, more particularly, to such a system wherein a phase modulated pseudonoise sequence signal is received. The signal may be the radar reflection off a target from a signal transmitted by the receiving system itself or may be a signal transmitted directly from another location, for example, a ground landing beacon.

The present invention finds utility in applications where it is required that the phase of the received signal relative to a local reference signal be determined accurately. Such an application may be, for example, in landing systems, air traffic control systems, and monopulse radar systems where the phase is measured at a plurality of receiving antennas so that the bearing of the received signal can be determined. In such a system, a radio frequency carrier may be phase modulated by a pseudonoise code. The code consists of a sequence of M binary bits chosen to be pseudorandom and to have low auto-correlation values. The relative phase of the modulated signal during a particular interval is $\pm 90°$, depending on the sign of the code element during that interval.

After the signal is received, it must be processed to determine not only its time of arrival but also its phase relative to the local reference signal at that time of arrival. Digital correlation provides a relatively low cost technique for determining the time of arrival of the received signal. It is an object of the present invention to be able to use digital correlation techniques and obtain relative phase measurement in a cost effective manner.

SUMMARY OF THE INVENTION

The foregoing, and additional, objects are attained in accordance with the principles of this invention by providing an arrangement which receives the incoming phase modulated pseudonoise sequence signal, derives inphase and quadrature components of the received signal relative to a reference signal, and quantizes the phase of the incoming signal in digital form. A digital correlator is utilized to determine the time of arrival of the received signal. At the same time, the arctangent of the phase quantized signal is continuously calculated. When the time of arrival is determined, the calculated arctangent at that time is utilized as the phase angle of the received signal.

BRIEF DESCRIPTION OF THE DRAWINGS

The foregoing will be more readily apparent upon reading the following description in conjunction with the drawing in which like elements in different figures thereof have the same reference numeral and wherein:

FIGS. 2A and 2B, with FIG. 2A being placed to the left of FIG. 2B, together illustrate an example of the application of the principles of this invention to a system for determining the azimuth and elevation phase differences of a phase modulated pseudonoise signal received by four antennas spaced as pairs in both azimuth and elevation.

DETAILED DESCRIPTION

Figure 1:
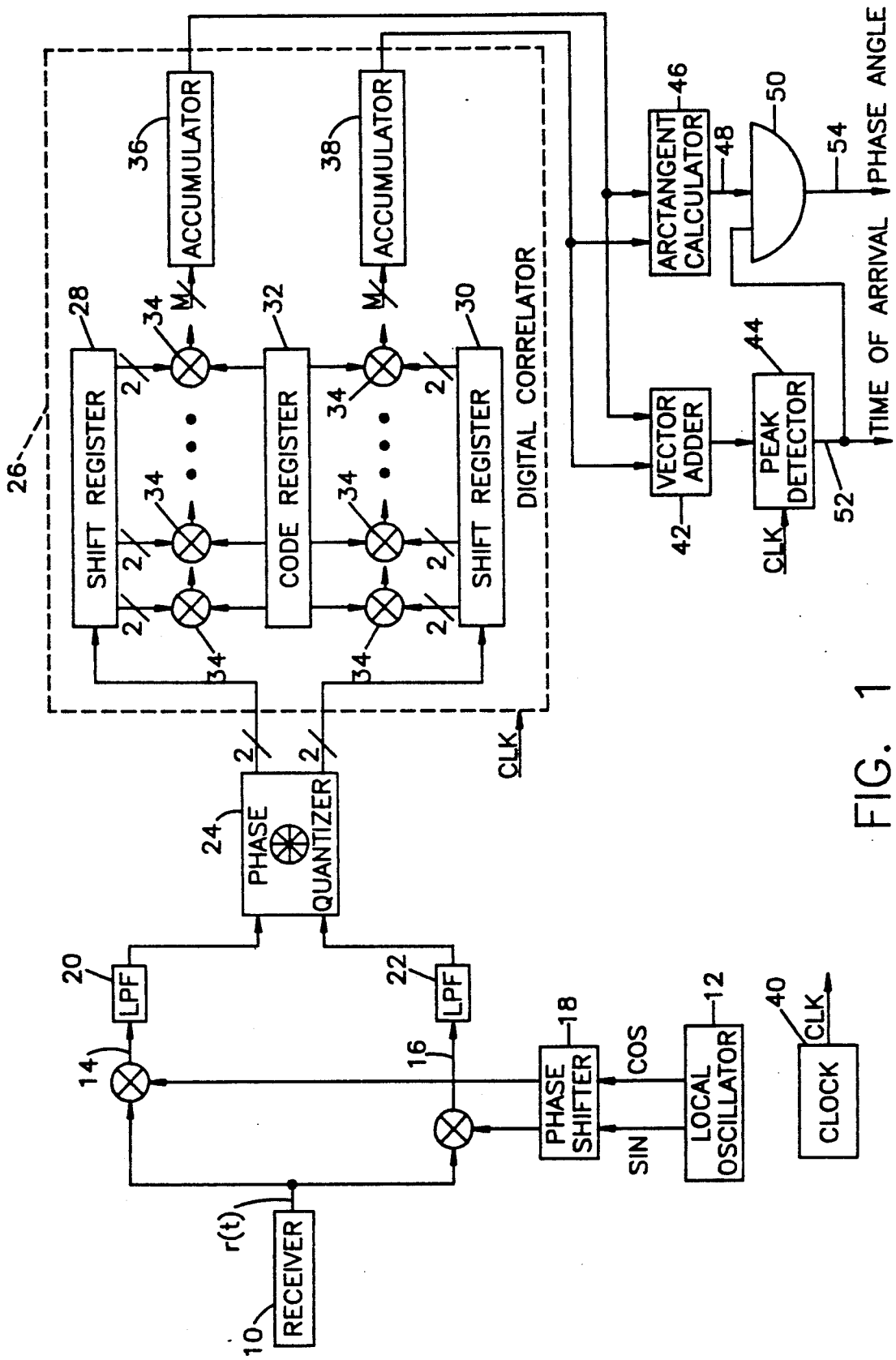
FIG. 1 is a block diagram of a system constructed in accordance with the principles of this invention which utilizes a digital correlator to determine the phase of a received phase modulated pseudonoise sequence signal relative to the phase of the reference signal.

Referring now to FIG. 1, the receiver 10 receives the signal which is an RF/IF carrier at the frequency $f_o$ which has been phase modulated by a pseudonoise code sequence. Illustratively, the modulation is Bi-Phase Shift Key (BPSK), but other modulation schemes such as MSK may be utilized as well. The input signal r(t) may be expressed in terms of the following equation:

$$r(t) = \cos(2\pi f_o t + C_i \phi(t - iT))$$

where:

$$\phi(t) = \{90°: -T/2 < t < T/2$$
$$\{0°: \text{Elsewhere}$$

$$C_i = \pm 1 \text{ for } i = 1 \text{ to } M$$

Thus, it is seen that the relative phase during the $i^{th}$ chip interval of duration T is $\pm 90°$ depending on the sign of the $i^{th}$ code element $C_i$, where the chip interval T is the period of the code clock. The code consists of M binary bits chosen to be pseudo-random and to have low auto-correlation values.

The received signal r(t) is split and mixed with sine and cosine signals generated from the local oscillator 12 at the frequency $f_o$ to generate in-phase and quadrature components of the input signal on the leads 14 and 16, respectively. (For now ignore the phase shifter 18, which will be discussed later.) The in-phase and quadrature components are then passed through conventional low pass anti-aliasing filters 20 and 22, respectively.

According to this invention, two distinct functions are performed. The first is determining the precise time of arrival of the received signal. The second function is to measure the relative phase of the incoming modulated signal. Since the received signal is not an instantaneously occurring signal, but rather is a sequence of received codes, the phase must be measured over the entire sequence.

According to this invention, these functions are performed effectively with a low resolution digital correlator of minimal complexity. Since preservation of the incoming amplitude is not important in the measurement of time of arrival or phase, it is only necessary to determine when the incoming phase code pattern matches an internally stored phase code pattern.

For time of arrival and phase detection, the in-phase and quadrature component values are treated as components of a vector and are quantized to two bits each, in this example, by the phase quantizer 24. The phase quantizer 24 accomplishes this by comparing the two vector components to determine which of eight phase octants the received signal sample is in. This octant information can then be unambiguously encoded into only two bits for each component. The digitized phase quantized signals are then provided as inputs to the digital correlator 26, which includes two 2-bit wide and M-bit long shift registers 28, 30. The digital correlator 26 has the pseudonoise code sequence stored in the code register 32. The digital correlator 26 also includes bit comparators 34 and accumulators 36 and 38.

A clock 40 is provided, which operates at a frequency of 1/T. At the clock rate, the incoming data from the phase quantizer 24 are shifted through the shift registers 28 and 30 and each two bit tap output or its negative is added to the respective accumulator 36 or 38 depending on whether the corresponding code bit stored in the register 32 is a 1 or a 0.

The outputs of the accumulators 36 and 38 are vector added in the adder 42 by taking the square root of the sum of the squares of the individual accumulator outputs. This produces a magnitude which is monitored by the peak detector 44 each clock time to detect a peak value above some predetermined threshold. When this peak is detected, this indicates a match between the incoming signal code and the stored code, and is used as the pseudonoise sequence time of arrival estimate. During this time, the calculator 46 is calculating the arctangent function of the output of the accumulator 38 divided by the output of the accumulator 36, and providing a signal representative of the arctangent on the lead 48 to the gate 50. When the peak detector 44 provides a time of arrival signal on the lead 52, this signal is utilized to gate the arctangent signal onto the lead 54, to thereby provide the desired estimate of the incoming signal phase.

When the signal to noise ratio of the incoming signal r(t) is very high, the phase quantizer 24 will introduce a bias error because of its low resolution. This bias error can be mitigated by introducing a limited linear phase sweep by means of the phase shifter 18. By linearly incrementing the phase shifter 18 over $\pm 22\frac{1}{2}°$ throughout a period of M clock times, the bias is averaged out. This technique is sometimes referred to as "dithering". Other phase variation schemes can also accomplish this result.

Figure 2B:
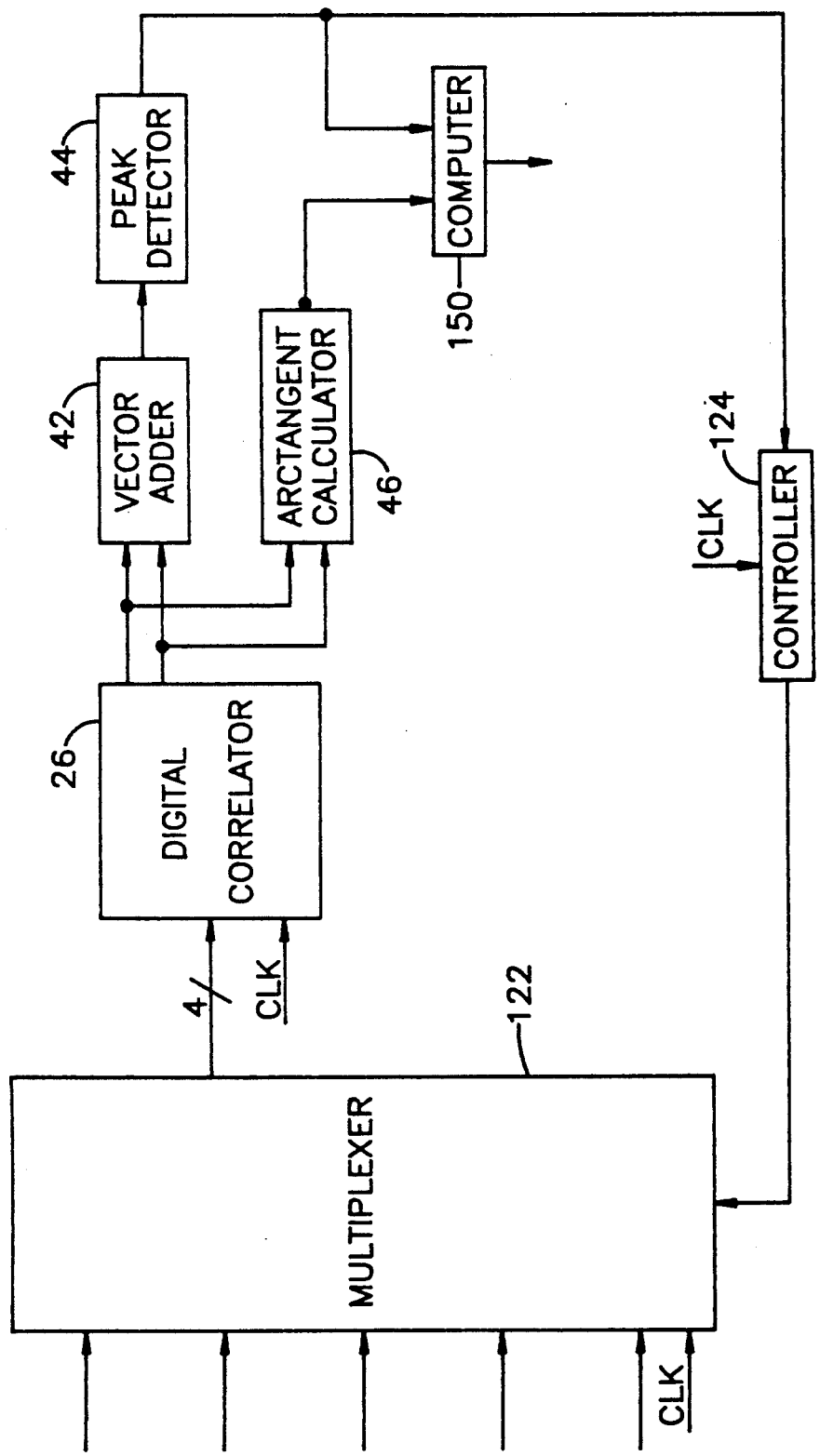

FIGS. 2A and 2B together illustrate an application of the aforedescribed technique for phase monopulse radar processed for azimuth and elevation. The system shown in FIGS. 2A and 2B receives its inputs from the four antenna horns 102, 104, 106 and 108. The antennas 102 and 104 are at a first elevation and the antennas 106 and 108 are at a second elevation. Similarly, the antennas 102 and 106 are at a first azimuth and the antennas 104 and 108 are at a second azimuth. Thus, the four antennas 102, 104, 106 and 108 are spaced as pairs in both azimuth and elevation. The system shown in FIGS. 2A and 2B determines the azimuth and elevation phase differences of the signal received by the antennas 102, 104, 106 and 108.

The outputs of the antennas 102, 104, 106 and 108 are combined in a conventional microwave combiner and radio frequency front end circuit 110 by means of hybrids and are down converted to intermediate frequency. Circuit 110 internally obtains a sum signal which is the sum of all four signals received by the antennas 102, 104, 106 and 108; an elevation difference signal which is equal to the difference between the sums of the signals received by the elevation spaced pairs of antennas (i.e., the sum of the signals received by the antennas 102 and 104 less the sum of the signals received by the antennas 106 and 108); and an azimuth difference signal which is equal to the difference between the sums of the signals received by the azimuth spaced pairs of antennas (i.e., the sum of the signals received by the antennas 102 and 106 minus the sum of the signals received by the antennas 104 and 108). The circuit 110 then provides five output signals. The signal on the lead 112 is the sum signal. The signal on the lead 114 is the sum signal plus the elevation difference signal phase shifted $+90°$. The signal on the lead 116 is the sum signal plus the elevation difference signal phase shifted $-90°$. The signal on the lead 118 is the sum signal plus the azimuth difference signal phase shifted $+90°$. The signal on the lead 120 is the sum signal plus the azimuth difference signal phase shifted $-90°$.

The phase of each of the signals on the leads 112, 114, 116, 118 and 120 is measured by the technique described with reference to FIG. 1 for the same received pseudonoise code sequence. This is accomplished by time sharing the digital correlator 26 for all five signals by means of the multiplexer 122.

Under the control of the controller circuit 124, which has as an input the output of the peak detector 44, the multiplexer 122 first passes to the digital correlator 26 the phase quantized sum signal from the lead 112. This signal is processed continuously until a peak is detected to provide a time of arrival signal. Meanwhile, the signals on the leads 114, 116, 118 and 120 are phase quantized and stored in respective shift registers 134, 136, 138 and 140. The shift register 134 has M stages; the shift register 136 has 2M stages; the shift register 138 has 3M stages; and the shift register 140 has 4M stages. After the time of arrival is determined, each of the four remaining phase measurements of the signals on the leads 114, 116, 118, 120 are made successively by the digital correlator 26. Because of the differing lengths of the shift registers 134, 136, 138 and 140, each of the measurements corresponds, timewise, to the received sequence which resulted in the time of arrival determination. Additional delays inherent in a practical time of arrival determination may be compensated by corresponding increases in the delays of shift registers 134, 136, 138 and 140.

The time of arrival and phase signals are provided to the computer 150. The computer 150 calculates the elevation phase difference as the difference between the phases computed for the signals on the leads 114 and 116 and calculates the azimuth phase difference as the difference between the phases computed for the signals on the leads 118 and 120. Although each of these individual phase measurements was made relative to the phase of the local oscillator 12, when the differences are taken, the local phase value is cancelled, producing the desired azimuth and elevation difference angles. In a conventional phase monopulse system, these electrical angel differences bear a known functional relationship to the desired physical off boresight azimuth and elevation angles which can thereby be determined.

Accordingly, there has been disclosed a system for measuring the phase of a received pseudonoise sequence using digital correlation techniques. While illustrative embodiments have been disclosed herein, it will be apparent to those skilled in the art that various modifications and adaptations to those embodiments are possible, and it is intended that this invention be limited only the scope of the appended claims.

I claim:

1. In a system where a phase modulated pseudonoise sequence signal is received, an arrangement for determining the phase of the received signal relative to the phase of a reference signal comprising:

means for deriving in-phase and quadrature components of the received signal relative to the reference signal;

means utilizing said in-phase and quadrature components for quantizing the phase of the received signal in digital form as in-phase and quadrature digital signals;
means for providing a clock signal;
a digital correlator including:
  a) means for providing said pseudonoise sequence in digital form as an ordered sequence of M binary code elements, where M is an integer;
  b) a first shift register having M stages;
  c) a second shift register having M stages;
  d) means utilizing said clock signal for providing said in-phase digital signals as a clocked input to said first shift register;
  e) means utilizing said clock signal for providing said quadrature digital signals as a clocked input to said second shift register;
  f) a first accumulator for accumulating the sum of M inputs thereto;
  g) a second accumulator for accumulating the sum of M inputs thereto;
  h) means operating synchronously with said clock signal for providing as M inputs to said first accumulator for each stage of said first shift register the contents of that stage if the corresponding code element of the pseudonoise sequence is a binary "1" and the negative of the contents of that stage if the corresponding code element is a binary "0"; and
  i) means operating synchronously with said clock signal for providing as M inputs to said second accumulator for each stage of said second shift register the contents of that stage if the corresponding code element of the pseudonoise sequence is a binary "1" and the negative of the contents of that stage if the corresponding code element is a binary "0";
means for obtaining the vector sum of the contents of the first and second accumulators and providing a corresponding vector sum signal; and
peak detector means responsive to said vector sum signal for providing a time of arrival signal when the vector sum signal achieves a peak value exceeding a predetermined threshold;
means for calculating the arctangent of the contents of the second accumulator divided by the contents of the first accumulator and providing a corresponding arctangent signal; and
means utilizing the time of arrival signal for gating the arctangent signal as a signal representative of the phase of the received signal.

2. The arrangement according to claim 1 wherein said deriving means includes:
  means for providing said reference signal;
  phase shift means for controllably shifting the phase of said reference signal; and
  means for controlling said phase shift means to linearly sweep over a fixed range of phases.

3. The arrangement according to claim 2 wherein said controlling means is operative to cause said phase shift means to linearly increment a phase shift within a range of $\pm 22\frac{1}{2}°$ throughout a period of M clock times.

4. In a system where a phase modulated pseudonoise sequence signal is received by four antennas spaced as pairs in both azimuth and elevation, an arrangement for determining the azimuth and elevation phase differences of the signal received by the antennas comprising:
  means for combining the signals received by the four antennas to obtain a sum signal which is the sum of all four received signals, an elevation difference signal which is equal to the difference between the sums of the signals received by the elevation spaced pairs of antennas, and an azimuth difference signal which is equal to the difference between the sums of the signals received by the azimuth spaced pairs of antennas, the combining means providing the following five signals:
    a) a first signal which is said sum signal;
    b) a second signal which is said sum signal plus said elevation difference signal phase shifted $+90°$;
    c) a third signal which is said sum signal plus said elevation difference signal phase shifted $-90°$;
    d) a fourth signal which is said sum signal plus said azimuth difference signal phase shifted $+90°$; and
    e) a fifth signal which is said sum signal plus said azimuth difference signal phase shifted $-90°$; and
  processing means including a digital correlator for processing said sum signal to provide a time of arrival signal, responding to said time of arrival signal for processing said second, third, fourth and fifth signals to provide phase signals representative of the phases relative to a local carrier of said second, third, fourth and fifth signals, calculating the elevation phase difference as the difference between the phases of the second and third signals and calculating the azimuth phase difference as the difference between the phases of the fourth and fifth signals.

5. The arrangement according to claim 4 wherein said processing means comprises:
  means for providing a reference signal;
  means for deriving in-phase and quadrature components of said five signals relative to the reference signal;
  means utilizing said in-phase and quadrature components for quantizing the phases of each of said five signals in digital form as in-phase and quadrature digital signals;
  means for providing a clock signal;
  means for delaying the phase quantized second signal by the length of the pseudonoise sequence;
  means for delaying the phase quantized third signal by twice the length of the pseudonoise sequence;
  means for delaying the phase quantized fourth signal by three times the length of the pseudonoise sequence;
  means for delaying the phase quantized fifth signal by four times the length of the pseudonoise sequence;
  a multiplexer having as its inputs the phase quantized first signal and the delayed phase quantized second, third, fourth and fifth signals, and as its output the phase quantized first signal followed by the delayed phase quantized second, third, fourth and fifth signals, each for the length of the pseudonoise sequence;
  a digital correlator including:
    a) means for providing said pseudonoise sequence in digital form as an ordered sequence of M binary code elements, where M is an integer;
    b) a first shift register having M stages;
    c) a second shift register having M stages;
    d) means utilizing said clock signal for providing said in-phase digital signals from said multiplexer output as a clocked input to said first shift register;

e) means utilizing said clock signal for providing said quadrature digital signals from said multiplexer output as a clocked input to said second shift register;

f) a first accumulator for accumulating the sum of M inputs thereto;

g) a second accumulator for accumulating the sum of M inputs thereto;

h) means operating synchronously with said clock signal for providing as M inputs to said first accumulator for each stage of said first shift register the contents of that stage if the corresponding code element of the pseudo noise sequence is a binary "1" and the negative of the contents of that stage if the corresponding code element is a binary "0"; and i) means operating synchronously with said clock signal for providing as M inputs to said second accumulator for each stage of said second shift register the contents of that stage if the corresponding code element of the pseudo noise sequence is a binary "1" and the negative of the contents of that stage if the corresponding code element is a binary "0";

means for obtaining the vector sum of the contents of the first and second accumulators when the input to said digital correlator corresponds to said sum signal and providing a corresponding vector sum signal;

peak detector means responsive to said vector sum signal for providing a time of arrival signal when the vector sum signal achieves a peak value exceeding a predetermined threshold;

means for calculating the arctangent of the contents of the second accumulator divided by the contents of the first accumulator when the input to said digital correlator corresponds to said second, third, fourth and fifth signals and providing corresponding arctangent signals;

means utilizing the time of arrival signal for synchronizing the operation of said multiplexer; and means utilizing the time of arrival signal and the arctangent signals for calculating the elevation phase difference as the difference between the arctangents corresponding to the second and third signals and for calculating the azimuth phase difference as the difference between the arctangents corresponding to the fourth and fifth signals.

6. The arrangement according to claim 5 wherein said deriving means includes:

phase shift means for controllably shifting the phase of said reference signal; and means for controlling said phase shift means to linearly sweep over a fixed range of phases.

7. The arrangement according to claim 6 wherein said controlling means is operative to cause said phase shift means to linearly increment a phase shift within a range of $\pm 22\frac{1}{2}°$ throughout a period of M clock times.

* * * * *